United States Patent
Mikajiri et al.

(10) Patent No.: US 7,224,499 B2
(45) Date of Patent: May 29, 2007

(54) DUST-PROOF STRUCTURE OF IMAGE-READING DEVICE

(75) Inventors: Satoshi Mikajiri, Okegawa (JP); Eiichi Hayashi, Saitama (JP)

(73) Assignee: Fujinon Corporation, Saitama (JP)

( * ) Notice: Subject to any disclaimer, the term of this patent is extended or adjusted under 35 U.S.C. 154(b) by 1044 days.

(21) Appl. No.: 10/385,467

(22) Filed: Mar. 12, 2003

(65) Prior Publication Data
US 2003/0184818 A1    Oct. 2, 2003

(30) Foreign Application Priority Data
Mar. 29, 2002  (JP) .............................. 2002-096756

(51) Int. Cl.
*H04N 1/04*    (2006.01)
*H04N 1/40*    (2006.01)
(52) U.S. Cl. ...................... 358/474; 358/471; 358/483; 358/497
(58) Field of Classification Search ................ 358/474, 358/471, 483, 497; 292/101; 399/211
See application file for complete search history.

(56) References Cited

U.S. PATENT DOCUMENTS 4,023,373 A *   5/1977  Hipkins .................. 405/259.6
6,688,824 B2 *  2/2004  Hayashi .................... 411/119
6,937,368 B2 *  8/2005  Liu ........................... 358/474
7,068,401 B2 *  6/2006  Johnson et al. ............. 358/474

FOREIGN PATENT DOCUMENTS

JP      H10-257252    9/1998
JP      2001-197259   7/2001

* cited by examiner

*Primary Examiner*—Jerome Grant
*Assistant Examiner*—Houshang Safaipour
(74) *Attorney, Agent, or Firm*—Arnold International; Bruce Y. Arnold

(57) ABSTRACT

An elastic fixing screw valve body is provided on a wall of a frame of an image-reading apparatus. The valve body allows a carriage fixing screw to be passed through the through-hole in the wall and the valve body when the image-reading device is prepared for transport to a new location so as to secure one or more carriages within the frame to the wall. The valve body also allows the carriage fixing screw to be removed when the image-reading device is prepared for normal scanning operation after being transported to the new location. In addition, the valve body acts to seal the interior space of the frame from invasion by dust via the through-hole when the carriage fixing screw is removed from the through-hole and normal scanning operation of the image-reading apparatus is resumed at the new location.

3 Claims, 5 Drawing Sheets

DUST-PROOF STRUCTURE OF IMAGE-READING DEVICE

BACKGROUND OF THE INVENTION

In an image-reading device which reads image data of a manuscript so as to provide data for various types of processing, such as in a copier or scanner, light from a light source such as a fluorescent lamp is illuminated onto the manuscript, and the light reflected from the manuscript is made to be incident onto a light receiver equipped with a photoelectric conversion device, such as a CCD. In a still-manuscript-type image-reading device, such as the image-reading device described in Japanese Laid-Open Patent Application H10-257252, the light of the light source is illuminated onto a manuscript placed on a platen glass and remains still while the light source moves. Because the optical path length from the manuscript to the light receiver must remain constant even if the illuminating position with respect to the manuscript changes, mirrors for directing the reflected light to the light receiver, etc., are moved with the light source along the manuscript.

A full-rate carriage and a half-rate carriage, that are movably positioned within a box-shaped frame that supports the platen glass at the top of the frame, are used to move the light source lamp and the mirrors. The full-rate carriage carries the light source and is moved over the entire area of the manuscript. It is equipped with a first mirror for directing the reflected light to the half-rate carriage. The half-rate carriage is moved half the distance that the full-rate carriage is moved, and is equipped with second and third mirrors for directing the light reflected by the first mirror to the light receiver.

When the image-reading device is transported to a different location, the full-rate carriage and the half-rate carriage can easily be moved by dynamic forces. To prevent this during a move, the full-rate carriage and the half-rate carriage are each fixed to one wall of the box-shaped frame using a carriage fixing screw that passes through the wall and secures the carriages at a fixed position along a wall of the box-shaped frame. After the image-reading device has been positioned at its new location, the carriage fixing screw is removed in order to allow the full-rate carriage and half-rate carriage to operate.

A carriage fixing structure of an image-reading device is described in Japanese Laid-Open Patent Application 2001-197259. In the carriage fixing structure of this image-reading device, a fixing screw for preventing a retaining ring from coming off is provided at the base of the box-shaped frame that supports the platen glass, and female threads that receive the fixing screw are formed in the carriage. The tip of the fixing screw is formed into a part of a sphere, and the female threads are formed at the peak of a truncated conical recess formed at the base of the carriage. Thus, the fixing screw can be guided into the recess and easily screwed into the female threads. However, the fixing screw is provided at the base of the box-shaped frame and a space for arranging the fixing screw below the box-shaped frame is needed, and this hinders making the image-reading device thin. Accordingly, it is desirable to operate the fixing screw from the side of box-shaped frame.

Recently, higher image-quality and a faithful reproducibility have come to be required for image-reading devices of this type. For example, in the case of producing a replica by a copier or in the case of reproducing a manuscript on a display connected to a personal computer, it is necessary to obtain image data more precisely.

In order to prevent dust from adversely affecting the detected image, the box-shaped frame that supports the platen glass can be sealed so as to be dust-proof. However, as mentioned above, since the carriage fixing screw is removed after the image-reading device is positioned in a new location, the through-hole for passing through the screw remains in the wall. Therefore, dust from the through-hole can invade the box-shaped frame and adversely affect the performance of the image-reading device.

BRIEF SUMMARY OF THE INVENTION

The present invention relates to a dust-proof structure of an image-reading device for preventing the entry of dust into the box-shaped frame of an image-reading device such as a copier or a scanner from a through-hole formed in the box-shaped frame. A structure is provided which prevents dust from entering the through-hole which remains after a carriage fixing screw, that is used to fix the carriage(s) when the image-reading device is moved to a new location, is removed.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention provides a dust-proof valve structure for an image-reading device that includes a through-hole in a side of a box-shaped frame. The through-hole allows a carriage fixing screw to fix the carriage structure to a side wall of the box-shaped frame when the image-reading device is in transit to a new location. According to the present invention, when the carriage fixing screw is removed at the new location, the through-hole is blocked by the dust-proof valve structure so as to prevent dust from entering the box-shaped frame via the through-hole, thereby insuring that the quality of the scanned images will not be degraded by dust.

As discussed briefly above, while moving an image-reading device to a new location, a carriage fixing screw is normally used which passes through a through-hole in the wall of the box-shaped frame and fixes the full-rate carriage and the half-rate carriage to an inner wall of the box-shaped frame. When the image-reading device is set up for operation at the new location, the carriage fixing screw is removed from the carriages and extracted from the through-hole, making the full-rate carriage and the half-rate carriage movable. The present invention prevents the invasion of dust inside the box-shaped frame once the carriage fixing screw is removed by providing a fixing screw valve body on the inner surface of a wall of the box-shaped frame. The valve body may be formed by lacerating a central part of an elastomer sheet member.

When the carriage fixing screw is passed through the through-hole by pushing it inward, the fixing screw valve body is bent at the edge of the lacerated part and the tip end of the carriage fixing screw is passed through the valve body. When the carriage fixing screw is rotated in order to secure the carriage(s), the area surrounding laceration of the fixing screw valve body is bent inward so as to allow the carriage fixing screw to rotate. Therefore the carriage fixing screw can secure the carriages from moving during transit of the image-reading device.

If the carriage fixing screw is extracted from the through-hole, the fixing screw valve body is restored to the original shape of the sheet by its elasticity and blocks the through-hole. Thus, invasion of dust into the box-shaped frame is prevented.

During transport of the image-reading device to a new location, because the fixing screw valve body is formed using an elastomer, the transmission of vibrations of the box-shaped frame to the carriages is inhibited. In addition, the occurrence of noise caused by collisions of the carriages with the box-shaped frame is also inhibited.

The dust-proof structure of an image-reading device according to a preferred embodiment of the invention will now be described in detail with reference to the drawings.

Figure 1:
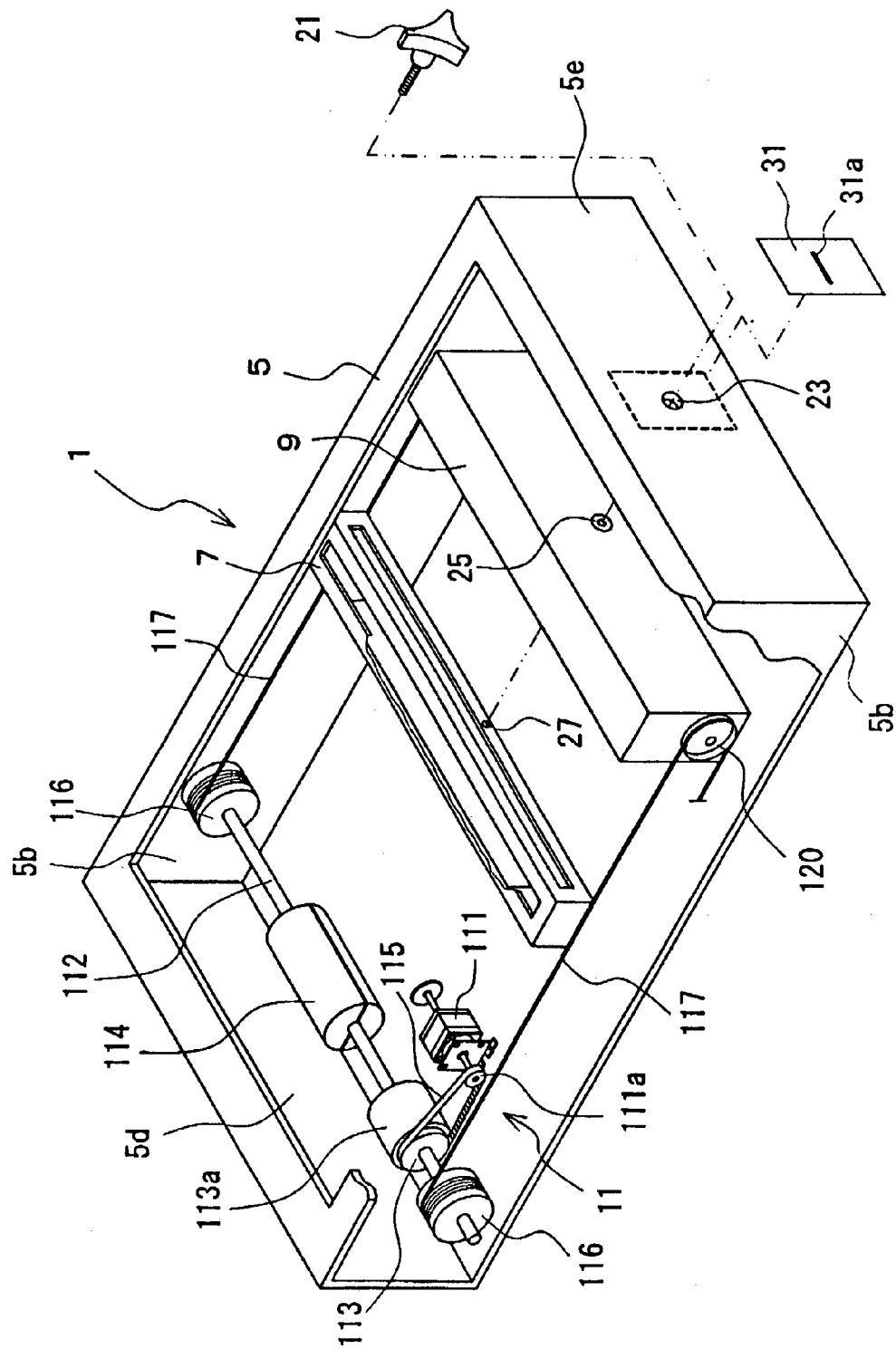
FIG. 1 is a schematic diagram showing, in perspective view, parts of the exterior and interior of an image-reading device equipped with a dust-proof structure relating to the invention.

FIG. 1 is a schematic, perspective view for illustrating the structure of the image-reading device 1, which includes a full-rate carriage 7, a half-rate carriage 9, and a drive mechanism 11 for moving these carriages within a box-shaped frame 5. Guide plates (not illustrated) are provided on the inner surface of walls 5b along the longitudinal direction of the box-shaped frame 5, and the full-rate carriage 7 and half-rate carriage 9 are guided by the guide plates and moved in the longitudinal direction of the box-shaped frame 5.

Figure 3:
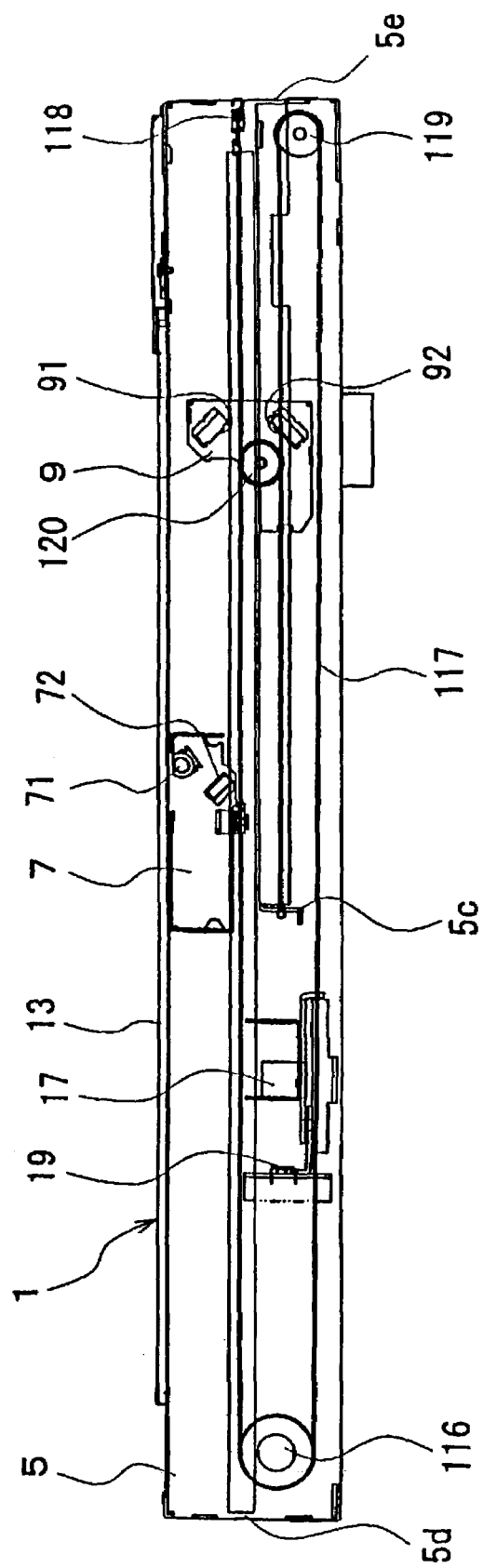
FIG. 3 is a vertical sectional view showing internal structure of an image-reading device according to the invention.

As shown in FIG. 3, a primary platen glass 13 is used where the image-reading device is of the still-manuscript type. In this type of image-reader, a manuscript is placed on the primary platen glass 13 and a light source and mirror are moved along the manuscript so as to read image-data from the manuscript. As an alternative to this arrangement, a secondary platen glass 15 (FIG. 4) may be used wherein the manuscript is moved relative to the box-shaped frame 5. In this type of image-reading device, the light source is held stationary while the manuscript is moved.

Figure 4:
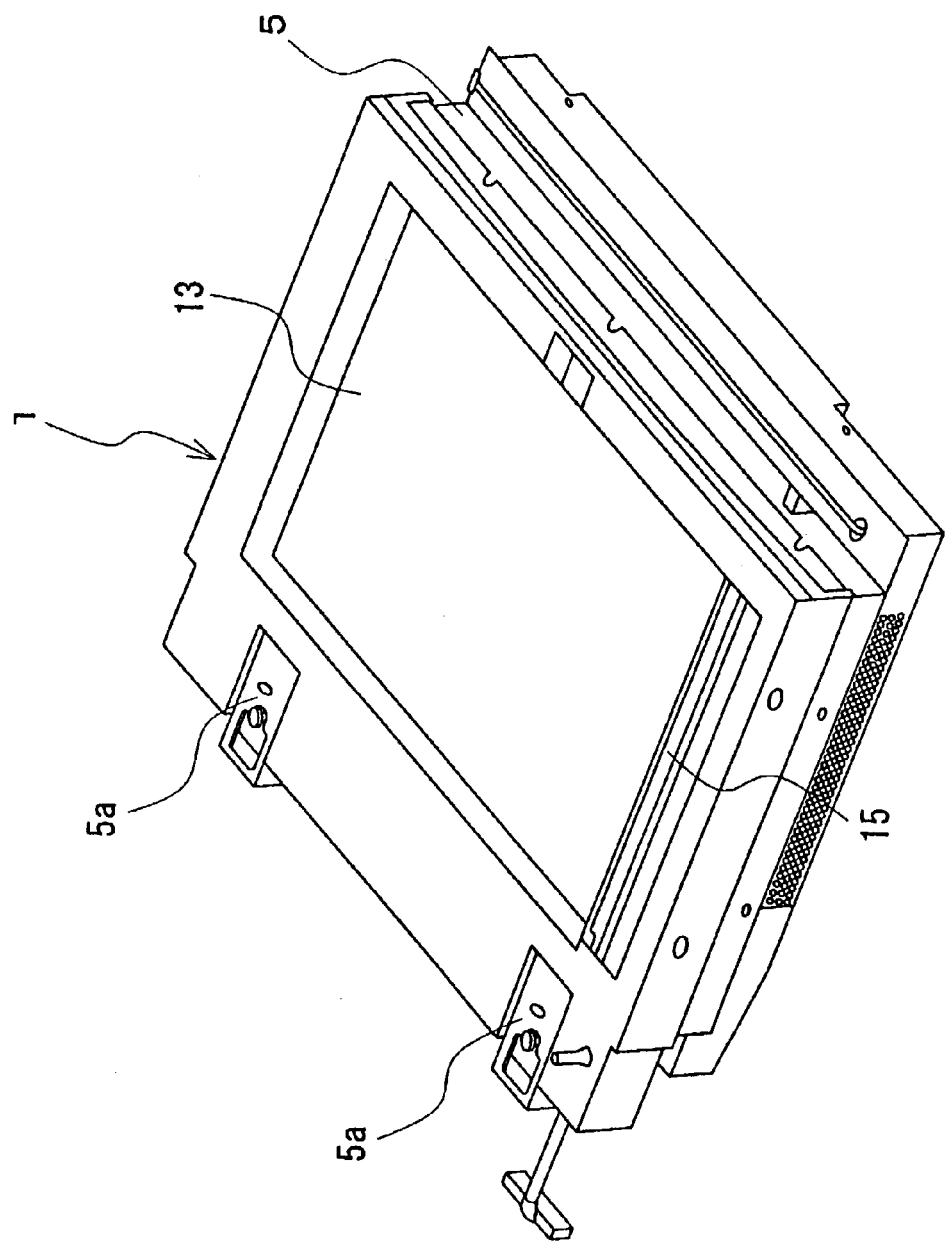
FIG. 4 is a perspective view showing the exterior of an image-reading device according to the present invention as seen from above.
Figure 5:
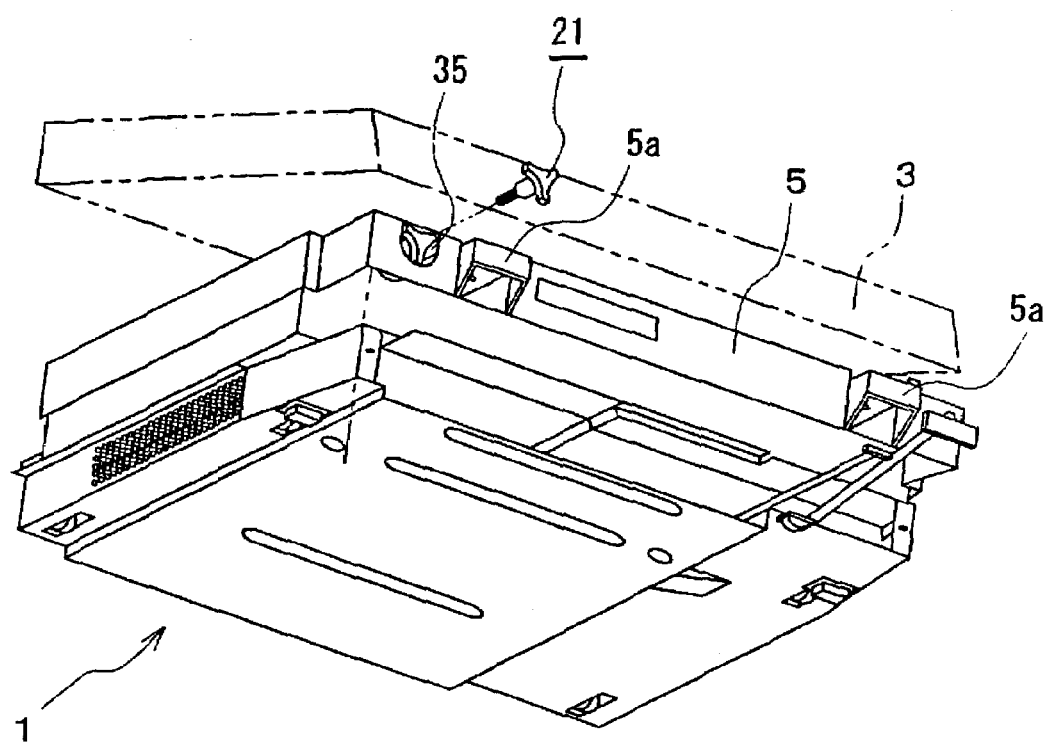
FIG. 5 is a perspective view showing the exterior of an image-reading device according to the present invention as seen from below.

FIG. 4 is a schematic perspective view showing the exterior of an image-reading device that includes a dust-proof structure according to the present invention. Hinge pedestals 5a, 5a for mounted hinges that support the cover 3 (FIG. 5) so as to be freely opened/closed may be provided on the back side of the top of the box-shaped frame 5. FIG. 5 shows, in dashed lines, a cover 3 that may be used to cover the platen of the image-reading device 1.

FIG. 3 is a sectional view in which the image-reading device 1 has been cut by a vertical plane in the longitudinal direction of the box-shaped frame. A light source lamp 71 and a first mirror 72 are mounted on the full-rate carriage 7. A manuscript is illuminated by the light source lamp 71, and the first mirror 72 reflects the reflected light of the manuscript to the half-rate carriage 9. A second mirror 91 and a third mirror 92 are provided on the half-rate carriage 9. Light incident from the first mirror 72 is first reflected, then transmitted through an imaging lens 17 provided at the base of the box-shaped frame 5, and then is incident into a photoelectric conversion device 19. Because the light must be illuminated over the entire area of the manuscript in order to read image information of the manuscript, the full-rate carriage 7 is made movable over the entire area of the primary platen glass. With the movement of this full-rate carriage 7, the length of the optical path formed by the first mirror 72, the second mirror 91 and the third mirror 92 for leading the reflected light from the manuscript to the photoelectric conversion device 19 must be held constant. In order to accomplish this, the half-rate carriage 9 is synchronized with the full-rate carriage 7 so as to move at one-half the rate of movement of the full-rate carriage 7

Referring to FIG. 1, the driving of the carriages 7, 9 is performed by a driving motor that is positioned in the vicinity of one wall 5d. A flywheel 113a is attached to the drive shaft 112 and a driving pulley 113 is used to drive the flywheel. A flywheel 114 is also attached to the central part of the drive shaft 112. A belt 115 is used to connect the output rotation of the drive motor 111 to the drive shaft 112.

Driving pulleys 116, 116 are attached at both ends of the drive shaft 112, and the central part of a driving wire 117 is wound around the driving pulley 116. As shown in FIG. 3, one end of the driving wire 117 is secured to a wall 5e opposite the driving motor 111 via a coil spring 118, that is held in tension. A guide pulley 119 is rotatably supported on the wall 5e. A pair of intermediate pulleys 120 on the same shaft are rotatably supported on the side of the half-rate carriage 9. From the end that is secured to a wall 5e, the driving wire 117 is wound on one of the two intermediate pulleys 120 and guided to the guide pulley 119. It is wound on this guide pulley 119, is guided to the driving pulley 116 and wound around it an appropriate number of times. Then, the driving wire 117 is guided from the driving pulley 116 to the other intermediate pulley 120 and the full-rate carriage 7 is connected to the driving wire 117 midway between the driving pulley 116 and the other intermediate pulley 120. It is then wound on the other intermediate pulley 120 and guided in the direction of the drive pulley 116. However, before reaching the drive pulley 116 and the other end is secured to a bracket 5c that is mounted to the wall 5b of the box-shaped frame 5. The drive mechanism 11 is well-known in this type of image-reading device, the full-rate carriage 7 and the half-rate carriage 9 are moved by the drive mechanism 11, and the moving speed of the half-rate carriage 9 is made to be one-half the moving rate of the full-rate carriage 7.

When the image-reading device 1 is transported to a different location, the full-rate carriage 7 and the half-rate carriage 9 are fixed to the wall 5e. Through-holes 23, 25 through which a carriage fixing screw 21 can be passed are formed in the wall 5e and in the half-rate carriage 9, respectively, and female threads 27 are formed in the full-rate carriage 7 so as to receive the fixing screw 21.

Figure 2A:
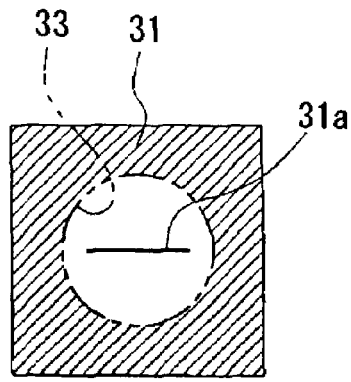
FIGS. 2(a)–2(d) are front views of examples of a fixing screw valve body that forms a dust-proof structure relating to the invention.
Figure 2B:
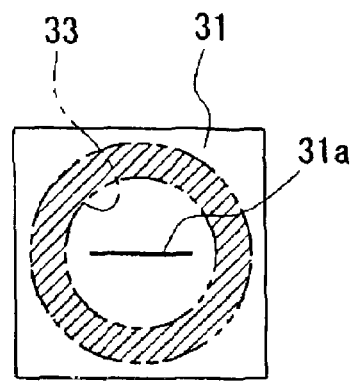
Figure 2C:
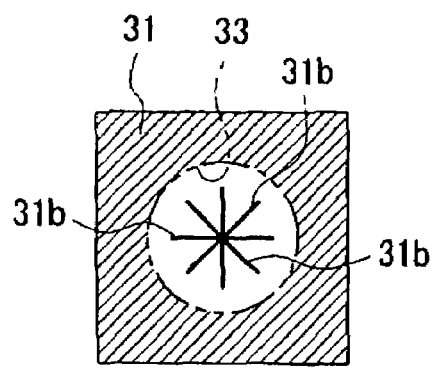
Figure 2D:
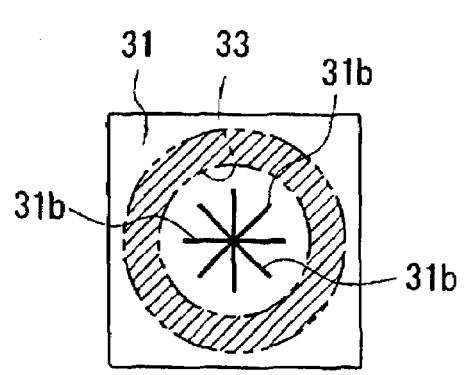

A fixing screw valve body 31 is adhesively affixed to the inner side of the wall 5e in a position blocking the through-hole 23. FIGS. 2(a)–2(d) show front views of the fixing screw valve body 31. The fixing screw valve body 31 is formed of a nearly square sheet of rubber or flexible plastic (i.e., synthetic resin). When the fixing screw valve body 31 is formed of a material such as rubber that is highly elastic, a linear laceration 31a of a suitable length is formed in the central part of the valve body, as shown in FIGS. 2(a) and 2(b). When the fixing screw valve body 31 is of a material such as plastic that is not highly elastic, multiple lacerations 31b are radially formed from one point as shown in FIGS. 2(c) and 2(d). When no external force is applied, all the lacerations 31a, 31b abut one another so as to form a seal that is dust-proof. The fixing screw valve body may be adhesively attached to the wall 5e, using an adhesive or a double-sided adhesive tape. As shown by the cross-hatching in FIGS. 2(a)–2(d), the adhesive may be generously applied everywhere beneath the fixing screw valve body except for the area of the through-hole 23 as shown in FIGS. 2(a) and 2(c), or it may be applied less generously, as shown in FIGS. 2(b) and 2(d) so as to seal the through-hole 360 degrees around its perimeter. As shown in FIG. 5, the back of the box-shaped frame can include a screw receiver 35 which is used to store the carriage fixing screw 21 when the carriages are in their normal operation, or scanning state.

When the image-reading device 1 is transported, both the full-rate carriage 7 and the half-rate carriage 9 are moved as close to the wall 5e as possible. Next, the carriage fixing screw 21 is inserted from the outside of the box-shaped frame 5 into the through-hole 23. At this time, the carriage fixing screw 21 is inserted into the central part of the fixing screw valve body 31. Since the fixing screw valve body 31 is formed of an elastic material, the edges of the laceration(s) 31a (31b) are bent inward by the carriage fixing screw 21 so that the carriage fixing screw passes through the through-hole 25 of the half-rate carriage 9 and reaches the female threads 27 of the full-rate carriage 7. The carriage fixing screw 21 is then tightened so as to secure both carriages. Since the edges of the lacerations 31a (31b) are bent, the carriage fixing screw 21 is able to rotate. Accordingly, when the carriage fixing screw 21 is screwing into the female threads 27 the full-rate carriage 7 and the half-rate carriage 9 are fixed to the wall 5e. When the image-reading device 1 is transported in this state, the carriages 7, 9 are secured to the wall 5e and can be transported without damage. After the image-reading device 1 has been moved to its new location, the carriage fixing screw 21 is rotated so as to release it from the female threads 27. Then, the carriage fixing screw 21 is withdrawn from the through-hole 25 of the half-rate carriage 9 and the through-hole 23 of the wall 5e. At this time, since the edge of the laceration(s) 31a (31b) allow the carriage fixing screw 21 to be withdrawn, the carriage fixing screw 21 can be extracted, so as to allow both the full-rate carriage 7 and the half-rate carriage 9 to become free for conducting a scanning operation.

After the carriage fixing screw 21 is extracted, the edges of the laceration(s) are returned to the original position by the restorative force of the elastic material, thus restoring the fixing screw valve body 31 to its original shape. In this manner, the edges again abut one another so as to seal the through-hole 23. Accordingly, the invasion of dust via the through-hole 23 to the inside of the box-shaped frame 5 can be prevented. Moreover, the extracted carriage fixing screw 21 can then be stored in the screw receiver 35.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In an image-reading device that includes one or more carriages that move within a frame so as to read image information from a manuscript that is placed on the image-reading device, the improvement of: providing an elastic fixing screw valve body that enables a carriage fixing screw to be passed through the valve body when the image-reading device is prepared for transportation to a new location so as to secure the one or more carriages in fixed positions against a wall of the frame, and allows the carriage fixing screw to be removed when the image-reading device is prepared for normal scanning operation after being transported to said new location, said valve body acting to seal the interior space of the frame from the invasion of dust when the image-reading device is in its normal scanning operation state.

2. The improvement as set forth in claim 1, wherein the fixing screw valve body is formed by lacerating a central part of an elastomer sheet member.

3. The improvement as set forth in claim 2, wherein the fixing screw valve body is provided on the inner surface of a wall of the frame.

* * * * *